United States Patent [19]

Inoue

[11] Patent Number: 4,764,975
[45] Date of Patent: Aug. 16, 1988

[54] METHOD OF AND APPARATUS FOR COMPRESSING IMAGE DATA

[75] Inventor: Toshifumi Inoue, Kyoto, Japan

[73] Assignee: Dainippon Screen Mfg. Co., Ltd., Kyoto, Japan

[21] Appl. No.: 897,760

[22] PCT Filed: Dec. 6, 1985

[86] PCT No.: PCT/JP85/00671

§ 371 Date: Aug. 5, 1986

§ 102(e) Date: Aug. 5, 1986

[87] PCT Pub. No.: WO86/03610

PCT Pub. Date: Jun. 19, 1986

[30] Foreign Application Priority Data

Dec. 6, 1984 [JP] Japan .................................. 59-258743

[51] Int. Cl.[4] ............................................. G06K 9/36
[52] U.S. Cl. ..................................... 382/47; 340/731; 382/56
[58] Field of Search .................... 382/56, 47; 340/731; 358/287, 183, 22, 160, 180, 133, 260, 263

[56] References Cited

U.S. PATENT DOCUMENTS

| | | | |
|---|---|---|---|
| 4,153,896 | 5/1979 | White | 382/47 |
| 4,204,227 | 5/1980 | Gurley | 358/22 |
| 4,381,547 | 4/1983 | Ejiri | 382/47 |
| 4,468,755 | 8/1984 | Iida | 358/287 |
| 4,520,399 | 5/1985 | Iida | 358/287 |
| 4,528,693 | 7/1985 | Pearson et al. | 382/56 |
| 4,533,942 | 8/1985 | Gall et al. | 358/160 |
| 4,541,012 | 9/1985 | Tescher | 358/133 |
| 4,649,380 | 3/1987 | Penna | 340/731 |
| 4,654,651 | 3/1987 | Kishi et al. | 340/731 |
| 4,661,987 | 4/1987 | Anderson et al. | 382/47 |

Primary Examiner—Leo H. Boudreau
Attorney, Agent, or Firm—Lowe, Price, LeBlanc, Becker & Shur

[57] ABSTRACT

The present invention relates to image data compression utilized either when an original image is displayed on a monitor or when an original is reproduced with a desired reduction ratio. Pixel data of an original image are sequentially inputted synchronously with a clock signal (CY), and an average value of pixel data inputted theretofore is renewed in an averaging circuit (40) each time pixel data are inputted. The renewal of the average value is repeated until an assignment signal (CX) is outputted from a DDA circuit (30). The assignment signal assigns pixels of the original image to the same number of blocks as the number of pixels of a desired compressed image, which is adapted for a desired image compression. An output obtained from the averaging circuit (40) represents an average value of pixel data with respect to each block aligned in the vertical direction of the original image. In a DDA circuit (50) an assignment for blocks in the horizontal direction of the original is carried out. Average values of pixel data with respect to each block adaptable for the desired image compression are obtained by an averaging circuit (60), which average values are used as pixel data of each pixel of the compression image.

5 Claims, 6 Drawing Sheets

METHOD OF AND APPARATUS FOR COMPRESSING IMAGE DATA

TECHNICAL FIELD

The present invention relates generally to compression of image data, and, more particularly, to a method of and apparatus for compressing image data for use in displaying an image on a monitor or reproducing an image at a desired reproduction magnification based on image data obtained by photoelectrically scanning an original.

TECHNICAL BACKGROUND

It is well known in graphic arts to prepare color separation negatives or positives by applying predetermined processes to image data obtained by photoelectrically scanning an original by an image scanning and recording apparatus (hereinafter referred to as "color scanner"). In such a color scanner, since desired color corrections or gradation changes are made in processing electric image signals, it is necessary to display an image to be processed on a monitor or to simulate the image on a desired layout, in order to confirm processing results.

When displaying a desired image on a monitor, there is no problem when all the picture elements (hereinafter referred to as "pixels") of an original to be displayed are fewer than those of the monitor, but the original image cannot be displayed in its entirety on the monitor when all the pixels of the original image are greater than those of the monitor. For this reason, it is a general practice to either skip a predetermined number of pixels of the original image or to average the predetermined number of pixels thereof, by which the original image to be displayed is compressed to be adapted for display on the monitor.

In the case of skipping the predetermined number of pixels, however, it is difficult to display the image correctly on the monitor because a considerable amount of the original image is disregarded, which is very disadvantageous for graphic arts. On the other hand, U.S. Pat. No. 4,533,942 discloses a method of averaging a predetermined number of pixels of the original image, in which a desired number of pixels of an original image corresponding to one pixel of the monitor is processed as one block so that image compression with weighting may be carried out by evaluating or weighting respective pixels of the block. It is also described therein that image compression with uniformity can be carried out by averaging the pixels of the block.

In the foregoing averaging method, when a compression ratio is given in the form of 1/n (where "n" is an integer), the image compression can be done by averaging the predetermined number of pixels of the original image, to convert the same into one pixel of the monitor. However, when a compression ratio is not given in the form of 1/n, e.g., in the case that an original image having 1000 pixels is to be compressed into an image having 350 pixels which correspond to the entire pixels of the monitor, it is possible to effect the compression in an approximate integer compression ratio like $\frac{1}{3}$. In this case, however, an image displayed on the monitor is relatively small in comparison with an effective area of the monitor. This is undesirable in the graphic arts, because it is necessary to display an image as large as possible throughout the effective area of the monitor, especially in modern graphic arts which often requires quite fine and minute corrections and changes of the image.

The aforementioned problems may be caused when a reduced image with a desired reduction ratio is reproduced from an original.

Accordingly, it is a primary object of the present invention to display an image on a monitor or to reproduce the image at a desired compression ratio and with high fidelity to an original, based on image data photoelectrically obtained from the original.

Another object of the invention is to ensure an image to be displayed as large as possible on an effective area of a monitor.

A further object of the invention is to simplify the hardware construction of the apparatus.

DISCLOSURE OF THE INVENTION

The aforementioned objects are accomplished by this invention, with an apparatus which comprises: compression data input means for inputting image compression data including both the number of pixels of an original image and the number of pixels of a desired compressed image; first processing means for assigning the pixels of the original image to the same number of blocks as the pixels of the desired compressed image, based on said image compression data, which is adapted for the desired image compression; original image data storing means for storing the pixel data of the original image therein; and second processing means for receiving the pixel data of the original image sequentially outputted from the original image data storing means and averaging the pixel data received theretofore every time respective pixel data are received, thereby outputting an average value of pixels forming respective blocks assigned by the first processing means.

Preferably, the apparatus further comprises third processing means having substantially the same construction as the first processing means; and fourth processing means having substantially the same construction as the second processing means. The first processing means assigns the pixels of the original image sequentially aligned in the vertical direction to a predetermined number of blocks. The second processing means averages the pixel data of respective blocks sequentially aligned in the vertical direction of the original image, in accordance with the assignment of blocks by the first processing means. The third processing means assigns the pixels of the original image sequentially aligned in the horizontal direction to a predetermined number of blocks. And, the fourth processing means averages the pixel data of respective blocks sequentially aligned in the horizontal direction of the original image, according to the assignment of blocks by the third processing means and based on the average value of respective blocks obtained by the second processing means.

The first processing means preferably comprises: an adder to one of input terminals of which the number of pixels of a desired compressed image is inputted; a subtraction wherein one of input terminals of which is connected to the output terminal of said adder; a first register connected to the output terminal of said subtractor, the output terminal of said first register being connected to the other input terminal of said adder so as to form a positive feedback, said first register latching an output from said subtractor thereinto synchronously with an input clock of the pixel data of the original image; a comparator wherein one of the input terminals of which is connected to the output terminal of said first register, the number of pixels of the original image being inputted to the other terminal thereof; and a selector for selectively inputting either a zero signal or the number of pixels of the original image, the input terminal of said selector being connected to the output terminal of said comparator, the output terminal of said selector being in turn connected to the other input terminal of said subtractor. The comparator compares the output from the first register with the number of pixels of the original image. When the output of the first register is smaller than the number of pixels of the original image, the selector selects a zero signal, whereas when the output of the first register is larger than the number of pixels of the original image, said selector selects the number of pixels of the original image, and simultaneously the comparator outputs an assignment signal for assigning the predetermined number of pixels to a block.

The second processing means preferably comprises: a second register for sequentially latching the pixel data of the original image thereinto synchronously with a clock signal; a subtractor, one of the input terminals of which is connected to the output terminal of said second register; a counter for counting said clock signal; divider means, one of the input terminals of which is connected to the output terminal of said subtractor, and the other input terminal of which is connected to said counter; an adder, one of the input terminals of which is connected to the output terminal of said divider means; a third register connected to the output terminal of said adder for latching the output of said adder synchronously with said clock signal, the output terminal of said third register being connected to the other output terminals of said adder and of said subtractor respectively; and a fourth register connected to the output terminal of said adder. The abovementioned divider means preferably comprises an ROM table and a multiplier. In the second processing means, the counter is cleared by the assignment signal outputted from the first processing means, and the output from the adder is inputted to the fourth register synchronously with said assignment signal.

Another feature of the present invention relates to a method of compressing image data, which comprises the steps of: inputting image compression data including both the number of pixels of an original image and the number of pixels of a desired compressed image; assigning the pixels of the original image to the same number of blocks as that of pixels of said desired compressed image, based on said image compression data, which is adapted for the desired image compression; sequentially inputting pixel data of the original image synchronously with an input clock signal; averaging the pixel data theretofore every time respective pixel data are inputted; and outputting the average value of pixel data at the time when the same number of the pixel data as that of pixel forming one block is inputted. In this method, at assigning the pixels of the original image to the same number of blocks as that of pixels of desired compressed image, it is preferable to carry out the same both in the vertical and horizontal directions. In this case, it is preferable to obtain an average value of the pixels forming each block aligned in the vertical direction, to average respective average values of respective blocks aligned in the horizontal direction.

Having the aforementioned features, the present invention produces practically useful advantages as follows: the image compression of an original image can be made at a desired compression ratio, and furthermore with high fidelity to the original image. In the case of displaying an original image on a monitor, such image can be displayed as large as possible over the full effective area thereof, whereby a quite fine and minute image correction such as color correction can be easily made. Furthermore, in case of reproducing a reduced image, it is also possible to reproduce a reduced image at a desired reduction ratio and with high fidelity to the original image. In addition, such image data compression is attained by a simple hardware arrangement.

Other novel features and advantages of the invention will become apparent in the course of the following detailed description together with the accompanying drawings, which are directed only to the understanding of the present invention and not to the restriction of the scope of the invention.

BRIEF DESCRIPTION OF THE DRAWINGS

FIGS. 5 and 7 are timing charts respectively showing operational relations among respective elements of the image data compression circuit (8), in which

BEST MODE FOR CARRYING OUT THE INVENTION

Figure 1:
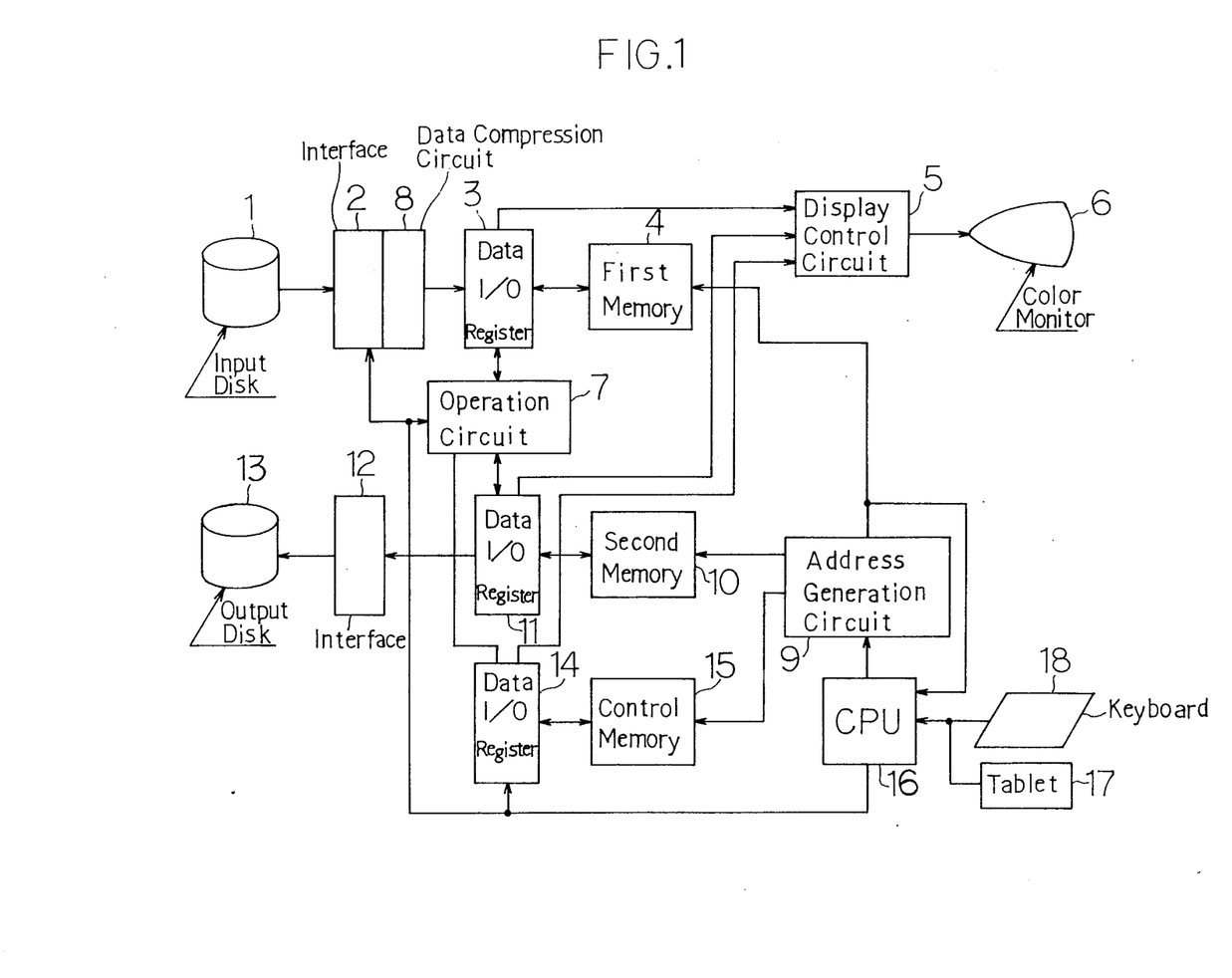
FIG. 1 is a block diagram schematically showing an outline of an image processing apparatus to which the present invention is applied.

FIG. 1 is a block diagram schematically showing an outline of an image processing apparatus embodying the present invention, and described hereinafter is the color correction of an image by using this image processing apparatus.

An original image is photoelectrically scanned by an image scanning apparatus (not shown) to obtain original image data, the image data being stored in an input disk (1) in the form of digital signals. The image data are read out sequentially from the input disk (1), which are compressed at a desired compression ratio by an image data compression circuit (8) provided to an interface (2). The image data are in turn stored in a first memory (4), through a data I/O register (3) according to the address assignment from an address generation circuit (9). The data compression by the circuit (8) is directed to conversion from the image of fine pixels stored in the input disk (1) to image data of relatively coarse pixels adaptable for display on a monitor (6), which is described in detail later.

The image data stored in the first memory (4) is then fed to a display control circuit (5) through the data I/O register (3) to display an image to be processed on a color monitor (6). An operator can apply the color correction to the image by operating a tablet (17) and a keyboard (18), while observing the image displayed on the color monitor (6). That is, instructions from the tablet (17) and the keyboard (18) are delivered to a CPU (16) which produces masking data for masking an area to be corrected. The masking data are stored in a control memory (15), according to address assignment from the address generation circuit (9). In the case that the color correction is made, for example, within a closed contour of the image to be processed, the masking data are stored in the control memory (15) in such a manner that the inside of the contour is established as "1" while the outside as "0". The color correction for a desired portion is effected by an operation circuit (7) based on both the image data from the first memory (4) and the mask data from the control memory (15).

Figure 2:
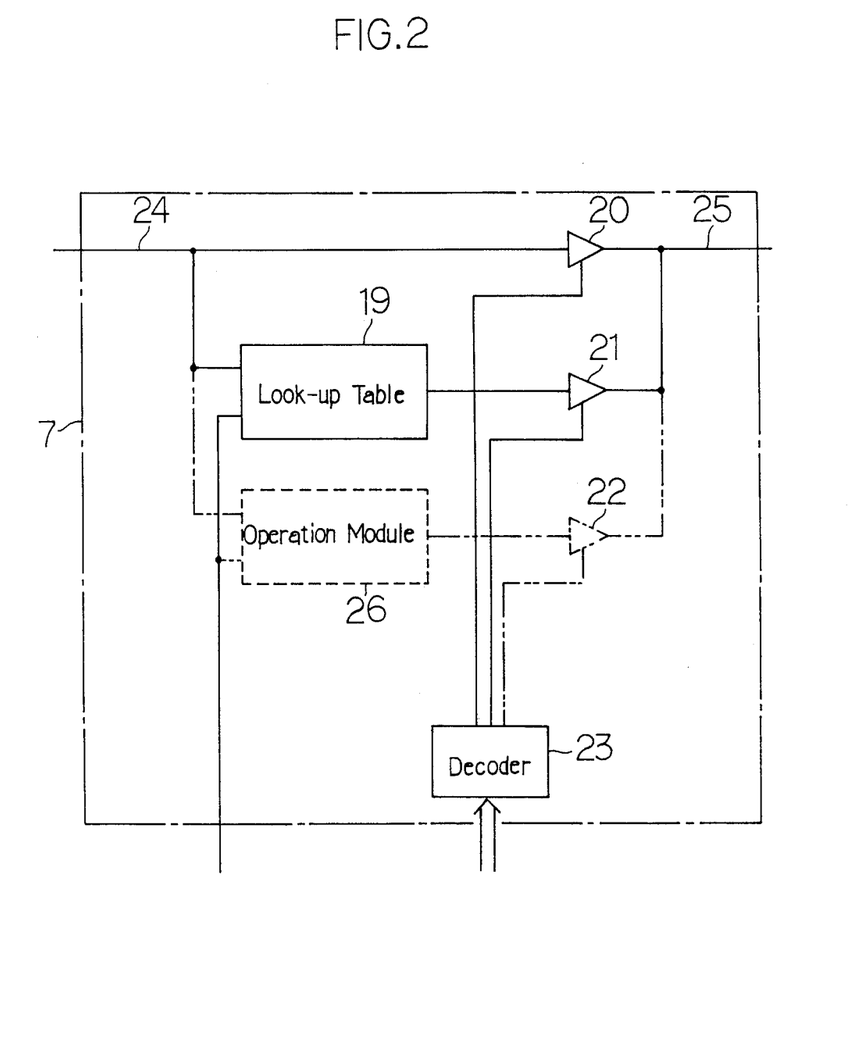
FIG. 2 is a circuit diagram showing an example of a processing circuit (7) in FIG. 1.

Referring to FIG. 2 which shows an example of the operation circuit (7), the image data from the first memory (4) are inputted from an input data line (24). When image data for a part of the original image where color correction is not required are inputted, a buffer (20) is opened by a control code, through a decoder (23), given from the CPU (16) as an operation mode, and the image data are outputted to an output data line (25) by way of a pass line. On the other hand, when image data for a part of the original image where the color correction is required are inputted to the operation circuit (7), a buffer (21) is opened by a control code, through the decoder (23), provided by the CPU (16) as an operation mode, and the image data are corrected by a lookup table (19), which are outputted to the output data line (25). At this process, required correction data are supplied by the CPU (16) to the lookup table (19) according to the instruction by the operator, so that a desired color correction is applied to the image data inputted to the operation circuit (7).

An operation module (26) is provided in the operation circuit (7) for other various operations, and the operation module (26) may be increased depending on the kind of operation required. The operation module (26) has various functions, such as color data processing, e.g., color masking correction, under color removal hue discrimination and gradation change; filtering processings, e.g., detail emphasizing; and masking processing, e.g., masking extraction. In order to achieve these functions successfully, the hardware may be comprised of such components as operation elements for addition, subtraction, multiplication and division by using logical gates, comparator and IC devices having data processing function enabling pipe line procession, instead of the lookup table as mentioned above.

The image data to which color correction has been applied by the operation circuit (7) are stored in a second memory (10) by way of a data I/O register (11) according to address assignment from the address generation circuit (9), and at the same time the content of correction in the operation circuit (7) is stored in a memory of the CPU (16) as historical data of the image correction applied to the image data stored in the first memory (4).

An operation can confirm visually states of images prior and subsequent to the image correction by displaying alternately the image data stored in the first memory (4) prior to the correction and the image data stored in the second memory (10) after the correction on the color monitor (6).

The aforementioned operations are repeated when the image correction is applied to other images stored in the input disk (1).

Since the image correction described above is applied to the image having coarse pixels stored in the first memory, i.e., to the image of which data is compressed by the data compression circuit (8), it is necessary to process the image data of fine pixels stored in the input disk (1) while referring to the historical data of the image correction stored in a memory provided in the CPU (16), and to store the corrected image which is confirmed by the operator on the color monitor (6), as image data of fine pixels which are adaptable for use in actual image reproduction, in an output disk (13). That is, after completing the image correction on the color monitor (6), memories (4), (10) and (15) are cleared by instructions from the keyboard (18), and the image data of fine pixels stored in the input disk (1) are stored in the first memory (4), by way of the interface (2) and the data I/O register (3), according to address assignment from the address generation circuit (9). In this connection, it may be impossible to store all the image data of an image stored in the input disk (1), because the number of pixels obtained by scanning an original image of 10 cm square with a 50 $\mu$m sampling spot is up to 2000×2000 pixels, when each of the memories (4), (10) has an ordinary capacity of 1024×1024 pixels. In this case, the original image data are assigned to predetermined groups, and the image data of each of the groups are stored in the first memory (4) alternately.

The image data stored in the first memory (4) are read out and inputted to the operation circuit (7), where a desired color correction is applied to the image data according to the historical data stored in the memory of the CPU (16). The image data are then stored in the second memory (10) according to address assignment from the address generation circuit (9) and further stored in the output disk (13) sequentially in order by way of the data I/O register (11) and an interface (12).

The operations described above are repeated when the processing on the image data of each of the groups as mentioned above is carried out, or when further image correction with respect to other images stored in the input disk (1) is carried out.

In such a manner described as above, the corrected image data are stored in the output disk (13). The corrected image data are to be used as input data for an image recording apparatus (not shown), by which a reproduction image with desired color correction is obtained.

With respect to FIGS. 1 and 2, the aforementioned description is directed only to the color correction applied to the image data of an original image, but the image data processing apparatus shown in FIGS. 1 and 2 has various functions for use not only in color correction but also in editing processing which arranges a plurality of images on a page, an image composite, a gradation change, etc., which do not directly relate to the essential of the present invention, and therefore the explanation on these functions is omitted (Japanese Patent Application No. 60-63762 discloses these functions in detail).

Figure 3:
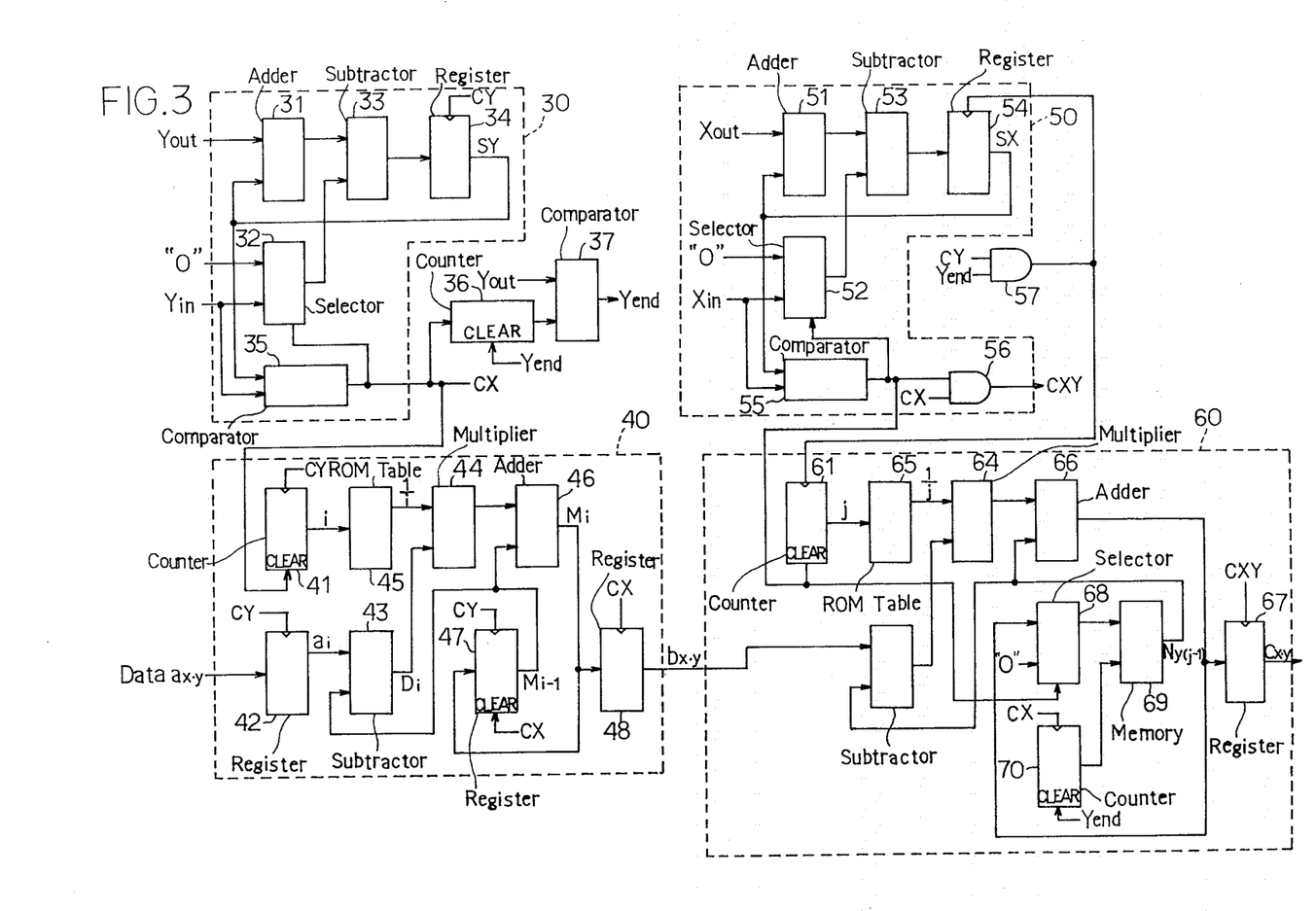
FIG. 3 is a circuit diagram showing an example of an image data compression circuit (8) according to the invention.

FIG. 3 is a circuit diagram which shows an embodiment of the image data compression circuit (8) according to the invention. The provision of the data compression circuit (8) is to compress the image data of fine pixels from the input disk (1) at a desired compression ratio as described above, but for the sake of simplicity, described hereunder is a case of data compression in which image data of an original image comprising 12×15 pixels as shown in FIG. 4(a) are compressed into the compressed image of 5×6 pixels as shown in FIG. 4(b).

As mentioned above, when the compression ratio of image data is given as 1/n ("n" is an integer), it is easy to obtain compression data by averaging a desired number of pixels of the original image data by averaging a desired number of pixels of the original image and converting the same into one pixel of the monitor (6). However, in the case of compressing at a compression ratio of 5/12 in the X-direction and 6/15 in the Y-direction as shown in FIG. 4, the pixels of the original image are assigned to blocks each of which includes a specified number of pixels, which is a prerequisite for averaging the image data, by utilizing digital differential analysis (hereinafter referred to as "DDA").

Figure 4:
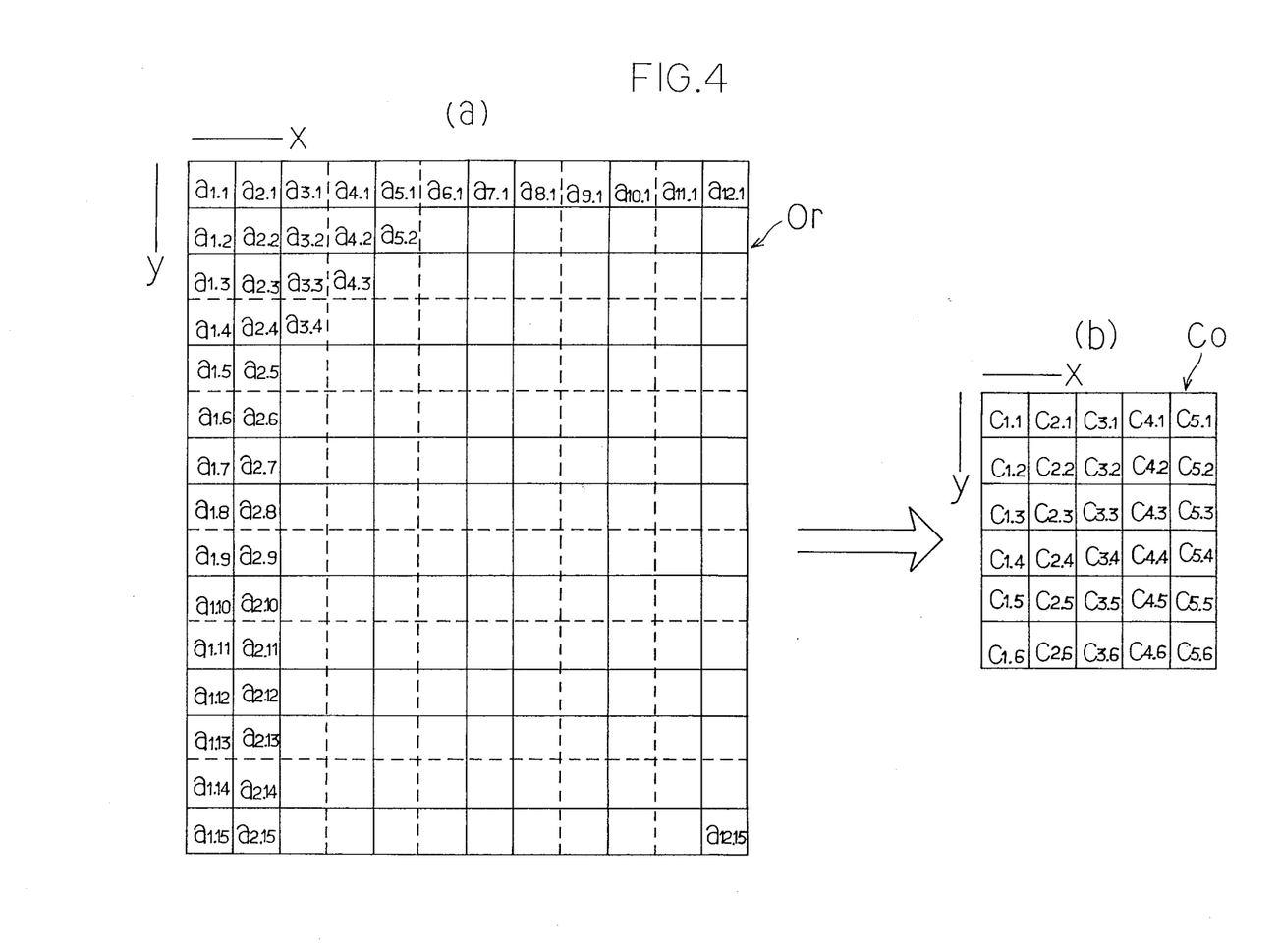
FIG. 4 is an explanatory view showing a relationship between the pixels of an original image and those of a desired compressed image.

A block (30) shown in FIG. 3 is a circuit for applying DDA to the pixels aligned in the Y-direction of the original image (or) shown in FIG. 4(a), in which the data compression in the Y-direction of the original image is carried out. The operator inputs desired compression data, i.e., a compression ratio of 5/12 in the X-direction and that of 6/15 in the Y-direction, to the CPU (16) through the keyboard (18). The CPU (16) in turn outputs a number signal (Yout) which represents the number of pixels in the Y-direction of the desired compression image (Co), i.e., "6", which is inputted to an adder (31) of the DDA circuit (30). Also, the CPU (16) outputs a number signal (Yin) which represents the number of pixels aligned in the Y-direction of the original image (or), i.e., "15", which is inputted to a selector (32). A zero signal ("0") is inputted to another terminal of the selector (32). The number signal (Yout) from the CPU (16) is inputted to a register (34) by way of the adder (31) and a subtractor (33). The register (34) latches the number signal (Yout) synchronously with a clock signal (CY), and then outputs an accumulated value (SY) of the number signal (Yout), for positive feedback to the other terminal of the adder (31). The output (SY) from the register (34) is further inputted to an input terminal of a comparator (35) for comparison with the number signal (Yin) inputted to the other input terminal of the comparator (35). When the value of the number signal (Yin) is bigger than that of the signal (SY), the selector (35) outputs a zero signal, which is inputted to the selector (32). At the time when the zero signal from the comparator (35) is inputted to the selector (32), the selector (32) outputs a zero signal to the subtractor (33). In such a way the number signal (Yout) is repeatedly latched into the register (34) synchronously with the clock signal (CY). for example, the value of the output (SY) from the register (34) synchronously with the third clock signal (CY) results in "18". In this case, the value of the number signal (Yin) is smaller than that of the signal (SY), thus the comparator (35) outputs a "1" signal to the selector (32). In response to the "1" signal the selector (32) outputs the number signal (Yin), i.e., "15", to the subtractor (33). At the same time, the comparator (35) also generates a clock signal (CX) to clear a counter (41). Furthermore, the clock signal (CX) from the comparator (35) is counted by a counter (36) to be compared with the number signal (Yout) by a comparator (37). When the counted number reaches "Yout+1", a signal (Yend) is outputted from the comparator (37). The counter (36) is cleared to be "1" by the signal (Yend).

The operations in the DDA circuit (30) described above are shown in the timing chart of FIG. 5. The signal (CX) outputted from the DDA circuit (30) assigns a predetermined number of pixels aligned in the Y-direction with respect to the respective lines of the original image (or), i.e., $a_{1.1}, a_{1.2}, \ldots, a_{1.14}, a_{1.15}; a_{2.1},$ $a_{2.2}, \ldots, a_{2.14}, a_{2.15}; \ldots; a_{12.1}, \ldots, a_{12.15}$, for respective pixels of the compressed image.

From the input disk (1), pixel data ($a_{x,y}$) of the original image (Or) are sequentially inputted to an averaging circuit (40) provided in the image data compression circuit (8) by way of the interface (2), and the pixel data ($a_{x,y}$) are latched into a register (42) synchronously with the clock signal (CY), thereby outputting an image signal ($a_i$). The image signal ($a_i$) is inputted to a terminal of a subtractor (43), and an output ($D_i$) of the subtractor (43) is in turn inputted to a terminal of the multiplier (44) by way of an ROM table (45). An output from the multiplier (44), i.e., $D_i/i$, is inputted to a terminal of an adder (46), and an output ($M_i$) from the adder (46) is further inputted to a terminal of a register (47), where the output ($M_i$) of the adder (46) is latched thereinto synchronously with the clock signal (CY), and an output ($M_{i-1}$) therefrom is inputted to respective terminals of the adder (46) and the subtractor (43).

The averaging circuit (40) has such an arrangement as described above, and the subtractor (43) carries out the operation:

$$D_i = a_i - M_{i-1} \quad (I)$$

while the adder (46) carries out the operation:

$$M_i = \frac{D_i}{i} + M_{i-1} \quad (II)$$

By subtracting the formula (I) for formula (II) the following is obtained:

$$\begin{aligned} M_i &= \frac{D_i}{i} + M_{i-1} \\ &= \frac{a_i - M_{i-1}}{i} + M_{i-1} \\ &= \frac{a_i}{i} + M_{i-1}\frac{i-1}{i} \end{aligned} \quad (III)$$

Meanwhile, $M_{i-1}$ is the average value up to (i−1)th input data, and thus it can be expressed as follows:

$$M_{i-1} = (a_1 + a_2 + \ldots + a_{i-1}) \times \frac{1}{i-1} \quad (IV)$$

By substituting formula (IV) for formula (III) the following result is obtained:

$$\begin{aligned} M_i &= \frac{a_i}{i} + \frac{a_1 + a_2 + \ldots + a_{i-1}}{i} \\ &= (a_1 + a_2 + \ldots + a_{i-1} + a_i) \times \frac{1}{i} \end{aligned} \quad (V)$$

which shows that the output from the adder (46) is the average value up to the (i)th input data.

The function of the averaging circuit (40) in connection with, for example, the first line ($a_{1.1} \sim a_{1.15}$) of the original image (Or) shown in FIG. 4(a) is as follows: The pixel data ($a_{x,y}$) are latched into the register (42) in sequential order beginning with the pixel data ($a_{1.1}$) synchronously with the clock signal (CY), and every time the pixel data ($a_{x,y}$) are latched into the register (42), the average value ($M_{i-1}$) of the pixel data latched theretofore is renewed. For example, when the input data of the third pixel ($a_{1.3}$) is latched into the register (42), a difference ($D_3$) between a value of the pixel ($a_{1.3}$)

and an average value of both the pixels ($a_{1.1}$) and ($a_{1.2}$) is outputted from the subtractor (43), which is inputted to a terminal of the multiplier (44). Meanwhile, to the other terminal of the multiplier (44) an inverse number of the number of the pixel signal (i) counted by the counter (41), i.e., the inverse number of "3", is inputted from the ROM table (45) to be multiplied in the multiplier (44). Then an output value of the multiplier (44) is added to an average value up to the pixel ($a_{1.2}$) in the adder (46), and the output value ($M_3$) is latched into a register (48) synchronously with the clock signal (CX). The output value ($M_3$) latched is an average value of the pixels ($a_{1.1} \sim a_{1.3}$). In the same manner, when the fifth pixel ($a_{1.5}$) is latched into the register (42), for example, both a value ($a_5$) of the pixel ($a_{1.5}$) and a value of the fourth pixel [the average value up to the third pixel is cleared by the clock signal (CX)] are inputted to a terminal of the multiplier (44). On the other hand, an inverse number of the number of pixel signals (i), i.e., the inverse number of "2", counted by the counter (41) is inputted from the ROM table (45) to the other terminal of the multiplier (44) to be multiplied therein. Furthermore, an output value of the multiplier (44) is added to a value of the pixel ($a_{1.4}$) in the adder (46), and an output ($M_5$) therefrom is latched into the register (48) as an average value of the pixels ($a_{1.4}$) and ($a_{1.5}$) synchronously with the clock signal (CX).

In such a manner described as above, in the DDA circuit (30) it is decided to assign a predetermined number of pixels to compressed image pixels of a desired compression ratio, with respect to the pixels continuously aligned in the Y-direction of the original image (Or), and the signal (CX) is outputted for assignment of the pixels. The assignment decided by the DDA circuit (30) for the first line shown in FIG. 4(a) results in six blocks, i.e., $a_{1.1} \sim a_{1.3}$; $a_{1.4} \sim a_{1.5}$; $a_{1.6} \sim a_{1.8}$; $a_{1.9} \sim a_{1.10}$; $a_{1.11} \sim a_{1.13}$; $a_{1.14} \sim a_{1.15}$, which correspond to six pixels of the first line ($c_{1.1} \sim c_{1.6}$) shown in FIG. 4(b). In the averaging circuit (40), each average value of the pixel data for each block of the original image (Or) is also decided. That is, the average value of the pixels ($a_{1.1} \sim a_{1.3}$) of the original image (Or) is obtained from the register (48) as an output ($b_{1.1}$), that of the pixels ($a_{1.4} \sim a_{1.5}$) as an output ($b_{1.2}$), that of the pixels ($a_{1.6} \sim a_{1.8}$) as an output ($b_{1.3}$), that of the pixels ($a_{1.9} \sim a_{1.10}$) as an output ($b_{1.4}$), that of the pixels ($a_{1.11} \sim a_{1.13}$) as an output ($b_{1.5}$) and that of the pixels ($a_{1.14} \sim a_{1.15}$) as an output ($b_{1.6}$), respectively. When the number of output signals from the register (48) reaches the number of the pixels in the Y-direction shown in FIG. 4(b), i.e., "6", a signal (Yend) is outputted. The signal (Yend) represents that the data compression of the original image (Or) is completed for the first line to proceed to the next line. The foregoing description will be clearly understood from the timing chart shown in FIG. 5.

In such a manner described as above, the data compression in the Y-direction is accomplished by both the DDA circuit (30) and the averaging circuit (40), while the data compression in the X-direction is effected by both the DDA circuit (50) and an averaging circuit (60).

The DDA circuit (50) is arranged substantially in the same manner as the DDA circuit (30), and in which the number of pixels aligned in the X-direction (Xout) of the compressed image (Co), i.e., "5", is inputted to a terminal of an adder (51), while the number of pixels aligned in the X-direction (Xin) of the original (Or), i.e., "12", is inputted to a terminal of a selector (52) respectively by instructions from the CPU (16). Arrangements and functions of an adder (51), a selector (52), a subtractor (53), a register (54) and a comparator (55) are substantially the same as those of the DDA circuit (30), and therefore repetitious description is omitted herein. A clock signal applied to the register (54) is an output of an AND gate (57), to which both the clock signal (CY) and the signal (Yend) are inputted. The register (54) outputs a signal (SX) synchronously with the clock signal outputted from the AND gate. When SX≧Xin, the comparator (55) outputs "1", by which the selector (52) outputs a number signal (Xin) which represents the number of pixels, i.e., "12". At the same time, the output of the comparator (55) is inputted to a terminal of an AND gate (56), to the other terminal of which the signal (CX) is inputted, whereby a signal (CXY) is outputted from the AND gate (56). The output of the comparator (55) is further inputted to a counter (61) of the averaging circuit (60) to clear it.

The signal (CXY) outputted from the DDA circuit (50) assigns the line pixels aligned in the X-direction of the original image (Or) shown in FIG. 4(a) for a predetermined number adapted to the compressed image, that is, respective blocks of 3 lines: 2 lines: 3 lines: 2 lines: 2 lines of the original (Or) correspond to each line of the compressed image.

Meanwhile, as described above, the average value for each block, i.e., $a_{1.1} \sim a_{1.3}$; $a_{1.4} \sim a_{1.5}$; $a_{1.6} \sim a_{1.8}$; $a_{1.9} \sim a_{1.10}$; $a_{1.11} \sim a_{1.13}$; $a_{1.14} \sim a_{1.15}$; $a_{2.1} \sim a_{2.3}$; $a_{2.4} \sim a_{2.5} \ldots$, determined by the DDA circuit (30) is latched into the register (48) synchronously with the clock signal (CX). The output ($b_{x.y}$) from the register (48) is inputted to a terminal of a subtractor (63), and an output from the subtractor (63) is further inputted to a terminal of a multiplier (64). To the other terminal of the multiplier (64) is inputted an inverse number of a counted value (j) from the counter (61) by way of an ROM table (65). An output from the multiplier (64) is inputted to a terminal of an adder (66), and an output from the adder (66) is further inputted to a terminal of a register (67) and to that of a selector (68) respectively. The selector (68) selects the input from the adder (66) when the input signal from the comparator (55) is zero, whereas it selects "0" when the input signal from the comparator (55) represents "1". In a memory (69), a value counted by a counter (70) is written as a memory address, output from the selector (68). An output from the memory (69) is inputted to the other terminal of the adder (66) and to that of the subtractor (63) respectively.

The function of the averaging circuit (60) is now described hereunder with reference to FIG. 4(a).

Averaging values of the pixel data for respective blocks ($a_{1.1} \sim a_{1.3}$; $a_{1.4} \sim a_{1.5}$; $a_{1.6} \sim a_{1.8}$; $a_{1.9} \sim a_{1.10}$; $a_{1.11} \sim a_{1.13}$; $a_{1.14} \sim a_{1.15}$) of the first line of the original image (Or) are latched into the register (48) synchronously with the clock signal (CX) in sequential order, and outputs ($b_{1.1}$, $b_{1.2}$, $b_{1.3}$, $b_{1.4}$, $b_{1.5}$, $b_{1.6}$) are outputted from the register (48). When processing with respect to the first line of the original image (Or) is carried out, the outputs ($b_{1.1}$, $b_{1.2}$, $b_{1.3}$, $b_{1.4}$, $b_{1.5}$, $b_{1.6}$) of the register (48) for the first line are written in the memory (69) as they are, according to the memory address given by the counter (70), since the value counted by the counter (61) represents "1" while the output of the memory (69) represents "0". Then average values of the pixel data for respective blocks ($a_{2.1} \sim a_{2.3}$; $a_{2.4} \sim a_{2.5}$; $a_{2.6} \sim a_{2.8}$; $a_{2.9} \sim a_{2.10}$; $a_{2.11} \sim a_{2.13}$; $a_{2.14} \sim a_{2.15}$) of the second line of the original image (Or) are latched sequentially into the register (48) synchronously with the clock signal (CX), and outputs ($b_{2.1}$, $b_{2.2}$, $b_{2.3}$, $b_{2.4}$, $b_{2.5}$, $b_{2.6}$) are outputted from the register (48). The outputs are subtracted sequentially from outputs ($N_{1.1}$, $N_{2.1}$, $N_{3.1}$, $N_{4.1}$, $N_{5.1}$, $N_{6.1}$) outputted from the memory (69) by the subtractor (63), and the results subtracted are sequentially inputted to the multiplier (64). When processing with respect to the second line of the original image (Or) is carried out, since the value counted by the counter (61) represents "2", the value $\frac{1}{2}$ is inputted to the multiplier (64) by way of the ROM table (65) to effect the multiplication by $\frac{1}{2}$. Further, in the adder (66) respective values of outputs ($N_{1.1}$, $N_{2.1}$, $N_{3.1}$, $N_{4.1}$, $N_{5.1}$, $N_{6.1}$) outputted from the memory (69) are sequentially added to the respective resultant values of the multiplication. The results of the addition are stored sequentially in the memory (69) by way of the selector (68) according to address assignment of the counter (70) to renew the contents stored in the memory (69). The data stored in the memory (69) are respective average values of the pixels ($a_{1.1} \sim a_{1.3}$, $a_{2.1} \sim a_{2.3}$; $a_{1.4} \sim a_{1.5}$, $a_{2.4} \sim a_{2.5}$; $a_{1.6} \sim a_{1.8}$, $a_{2.6} \sim a_{2.8}$; $a_{1.9} \sim a_{1.10}$, $a_{2.9} \sim a_{2.10}$; $a_{1.11} \sim a_{1.13}$, $a_{2.11} \sim a_{2.13}$; $a_{1.14} \sim a_{1.15}$, $a_{2.14} \sim a_{2.15}$) of the original image (Or). Then average values of the pixel data for respective blocks ($a_{3.1} \sim a_{3.3}$; $a_{3.4} \sim a_{3.5}$; $a_{3.6} \sim a_{3.8}$; $a_{3.9} \sim a_{3.10}$; $a_{3.11} \sim a_{3.13}$; $a_{3.14} \sim a_{3.15}$) of the third line of the original image (Or) are latched sequentially into the register (48) synchronously with the clock signal (CX), and outputs ($b_{3.1}$, $b_{3.2}$, $b_{3.3}$, $b_{3.4}$, $b_{3.5}$, $b_{3.6}$) are outputted from the register (48). These outputs are subtracted sequentially from the outputs ($N_{1.2}$, $N_{2.2}$, $N_{3.2}$, $N_{4.2}$, $N_{5.2}$, $N_{6.2}$) outputted from the memory (69) by the subtractor (63), and the results subtracted are sequentially inputted to the multiplier (64). When the processing with respect to the third line of the original image (Or) is carried out, since the value counted by the counter (61) represents "3", the value $\frac{1}{3}$ is inputted to the multiplier (64) by way of the ROM table (65) to effect the multiplication of $\frac{1}{3}$. Further, in the adder (66) respective values of outputs ($N_{1.2}$, $N_{2.2}$, $N_{3.2}$, $N_{4.2}$, $N_{5.2}$, $N_{6.2}$) are sequentially added to the respective resultant values of the multiplication. At this time, since the clock signal (CXY) is outputted from the AND gate (56) of the DDA circuit (30), outputs from the adder (66) are latched sequentially into the register (67) synchronously with the clock signal (CXY). At the same time, since the output signal "1" is applied by the comparator (55) of the DDA circuit (50) to the selector (68), the selector (68) selects "0", which is sequentially written in the memory (69) according to address assignment from the counter (70). The foregoing operation is repeated for processing the image data with respect to the following lines.

Figure 5:
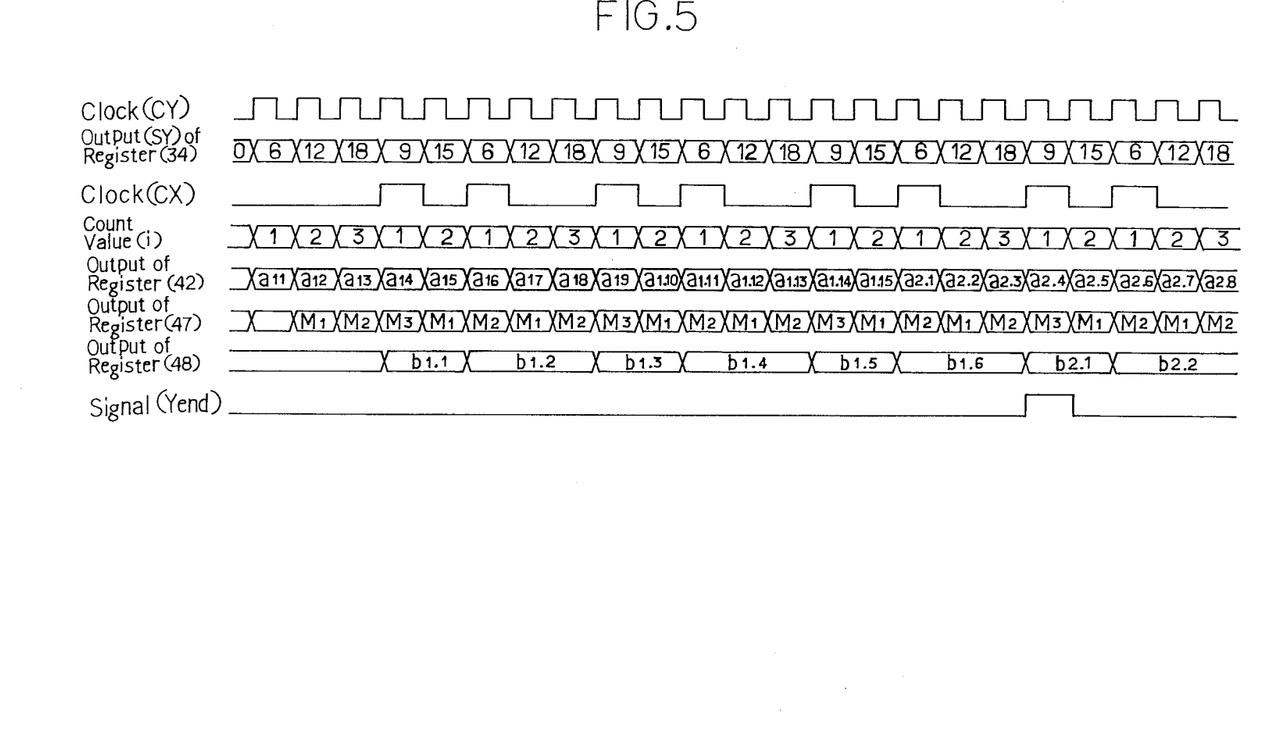
Figure 6:
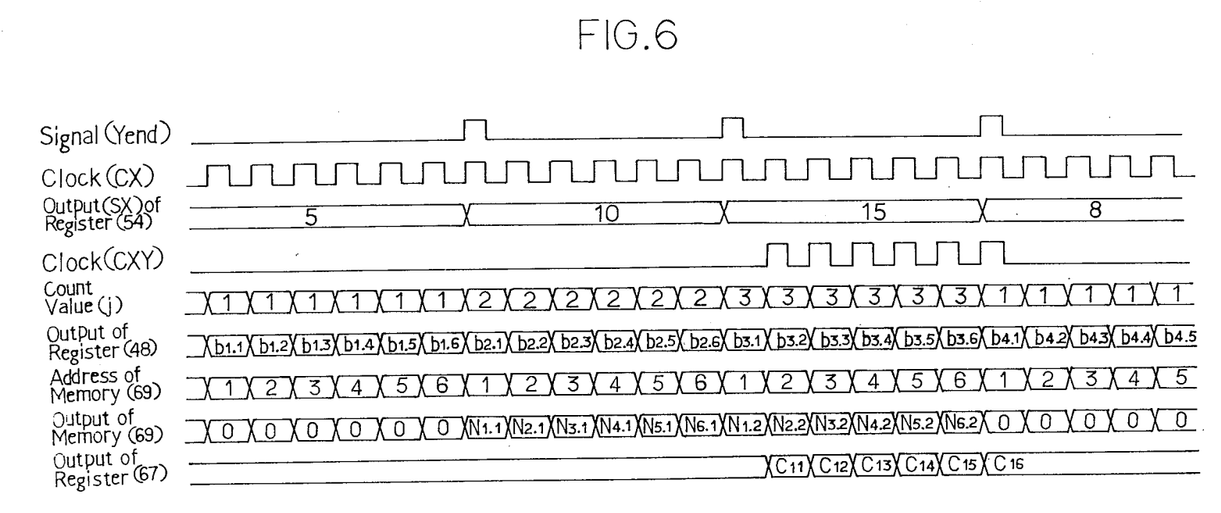
FIG. 6 is a macroscopic view of FIG. 5

Operation of each element of the DDA circuit (50) and the averaging circuit (60) will be apparent from the timing chart shown in FIG. 6 which is illustrated more macroscopically than that of FIG. 5 for convenience of illustration.

Figure 7:
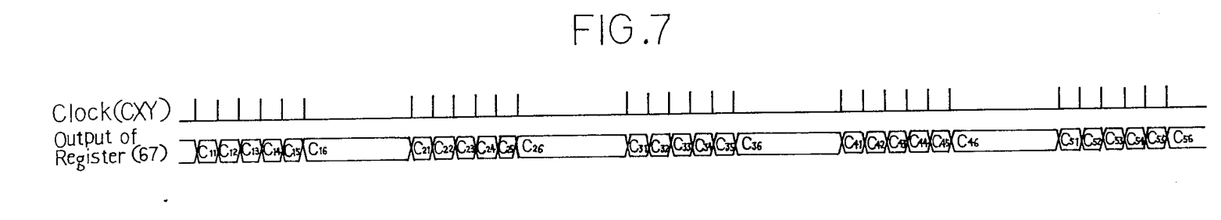
FIG. 7 is a further macroscopic view of FIG. 6.

Thus, average values for each block indicated by broken lines in FIG. 4(a) are latched into the register (67) synchronously with the clock signal (CXY), and outputs ($c_{1.1}$, $c_{1.2}$, ..., $c_{1.6}$; $c_{2.1}$, $c_{2.2}$, ..., $c_{2.6}$; ...; $c_{5.1}$, $c_{5.2}$, ..., $c_{5.6}$) are obtained from the register (67). Such outputs ($C_{x.y}$) represent image data for respective pixels of the compressed image shown in FIG. 4(b). FIG. 7 shows a timing chart for obtaining the outputs ($C_{x.y}$) of the register (67). The timing chart of FIG. 7 is broader than that of FIG. 6 for the sake of illustration.

The above description is directed to a case wherein the image data ($a_{x.y}$) of fine pixels of the original image (Or) is compressed into the image data ($C_{x.y}$) of coarse pixels adapted for display on the monitor. However, it should be understood that the described embodiment is only an example to facilitate the understanding of the present invention. Accordingly, the invention is not restricted to the above embodiment whatsoever. This invention is also applicable where an original image is reproduced and recorded at a desired reduction ratio, for example.

INDUSTRIAL APPLICABILITY

As explicit from the above description, the method and apparatus for compressing image data in accordance with the present invention is applicable when an original image is displayed on a monitor, or reproduced on a photosensitive material at a desired reduction ratio.

I claim:

1. An apparatus for compressing image data comprising:

compression data input means for inputting image compression data including both the number of pixels of an original image and the number of pixels of a desired compressed image;

first processing means for assigning the pixels of the original image to a same number of blocks as the pixels of the desired compressed image, based on said image compression data, which is adapted for a desired image compression;

original image data storing means for storing pixel data of the original image therein; and second processing means for receiving said pixel data of the original image sequentially outputted from said original image data storing means and averaging said pixel data received theretofore every time respective pixel data are received, thereby outputting an average value of pixels forming respective blocks assigned by said first processing means wherein said first processing means comprises:

an adder having an input terminal to which the number of pixels of the desired compressed image is inputted;

a subtractor having an input terminal to which is connected an output terminal of said adder;

a register connected to an output terminal of said subtractor, an output terminal of said register being connected to another input terminal of said adder so as to form a positive feedback, said register latching an output from said subtractor thereinto synchronously with an input clock of the pixel data of the original image;

a comparator having an input terminal to which is connected the output terminal of said register, the number of pixels of the original image being inputted to the other terminal thereof; and a selector for selectively inputting either a zero signal or the number of pixels of the original image, the input terminal of said selector being connected to an output terminal of said comparator, an output terminal of said selector being in turn connected to another terminal of said subtractor, whereby said comparator compares the output from the first register with the number of pixels of the original image, so that said selector selects the zero signal when the output of said register is smaller than the number of pixels of the original image, whereas said selector selects the number of pixels of the original image when the output of the register is larger than the number of pixels of the original image, and simultaneously said comparator outputs an assignment signal for assigning a predetermined number of pixels to a block.

2. An apparatus set forth in claim 1:
third processing means having substantially the same construction as the first processing means; and
fourth processing means having substantially the same construction as the second processing means;
wherein said first processing means includes means for assigning pixels of the original image sequenlly aligned in the vertical direction to a predetermined number of blocks; and
said second processing means including means for averaging pixel data of respective blocks sequentially aligned in the vertical direction of the original image, in accordance with the assignment of blocks by said first processing means;
the apparatus further comprising:
third processing means for assigning pixels of the original image sequentially aligned in the horizontal direction to a predetermined number of blocks; and
fourth processing means for averaging pixel data of respective blocks sequentially aligned in the horizontal direction of the original image, according to the assignment of blocks by said third processing means and based on an average value of respective blocks obtained by said second processing means.

3. An apparatus for compressing image data comprising:
compression data input means for inputting image compression data including both the number of pixels of an original image and the number of pixels of a desired compressed image;
first processing means for assigning the pixels of the original image to a same number of blocks as the pixels of the desired compressed image, based on said image compression data, which is adapted for a desired image compression;
original image data storing means for storing pixel data of the original image therein; and
second processing means for receiving said pixel data of the original image sequentially outputted from said original image data storing means and averaging said pixel data received theretofore every time respective pixel data are received, thereby outputting an average value of pixels forming respective blocks assigned by said first processing means wherein said second processing means comprises:
a first register for sequentially latching the pixel data of the original image thereinto synchronously with a clock signal;
a subtractor having an input terminal to which is connected an output terminal of said second register;
a counter for counting said clock signal;
divider means having an input terminal to which is connected an output terminal of said subtractor, and having another terminal to which is connected said counter;
an adder having an input terminal to which is connected an output terminal of said divider means;
a second register connected to an output terminal of said adder for latching the output of said adder synchronously with said clock signal, an output terminal of said second register being connected to other output terminals of said adder and said subtractor, respectively; and
a third register connected to the output terminal of said adder.

4. An apparatus set forth in claims 1 or 3, wherein said divider means comprises an ROM table and a multiplier.

5. An apparatus set forth in claims 1 or 3, including means for applying said assignment signal for assigning the pixels of the original image to a predetermined number of blocks to said counter so as to clear the same, and means for applying an output from said adder to said fourth register synchronously with said assignment signal.

* * * * *